US010420975B2

United States Patent
Chuang et al.

(10) Patent No.: US 10,420,975 B2
(45) Date of Patent: Sep. 24, 2019

(54) ACTIVE AND PASSIVE EXERCISE TRAINING EQUIPMENT

(71) Applicant: Cheng Shiu University, Kaohsiung (TW)

(72) Inventors: Pin-Hung Chuang, Kaohsiung (TW); Yi-Ta Chuang, Kaohsiung (TW); Yu-Hsien Chiu, Kaohsiung (TW)

(73) Assignee: CHENG SHIU UNIVERSITY, Kaohsiung (TW)

( * ) Notice: Subject to any disclaimer, the term of this patent is extended or adjusted under 35 U.S.C. 154(b) by 241 days.

(21) Appl. No.: 15/390,391

(22) Filed: Dec. 23, 2016

(65) Prior Publication Data
US 2017/0182346 A1 Jun. 29, 2017

(30) Foreign Application Priority Data

Dec. 25, 2015 (TW) .............................. 104143727 A

(51) Int. Cl.
*A63B 21/00* (2006.01)
*A63B 23/12* (2006.01)
(Continued)

(52) U.S. Cl.
CPC ..... *A63B 21/00178* (2013.01); *A61H 1/0229* (2013.01); *A61H 1/0292* (2013.01);
(Continued)

(58) Field of Classification Search
CPC .. A61H 1/0229; A61H 1/0237; A61H 1/0274; A61H 1/0292; A61H 2201/0192; A61H 2201/1207; A61H 2201/1633; A61H 2201/1635; A61H 2201/164; A61H 2201/1676; A61H 2203/0406; A61H 2203/0431; A63B 21/00178; A63B 21/068; A63B 21/4033; A63B 21/4034; A63B 21/4035; A63B 21/4039; A63B 21/4049; A63B 23/0205; A63B 23/0233;
(Continued)

(56) References Cited

U.S. PATENT DOCUMENTS 5,147,259 A * 9/1992 Hutchins ............ A63B 21/4045
482/101
6,398,699 B1 * 6/2002 Yang ...................... A63B 22/14
482/142
(Continued)

*Primary Examiner* — Joshua Lee
(74) *Attorney, Agent, or Firm* — Klintworth & Rozenblat IP LLP

(57) ABSTRACT

The present invention provides an active and passive exercise training equipment comprising a swinging device, a supporting device, and a front supporting device. The swinging device comprises a seat cushion with moving function for a user to sit. The supporting device comprises a telescopic rack and a top rack for the user to grip. The top rack is set on the telescopic rack for being located at different heights. The front supporting device comprises a front telescopic rack and a front grip for the user to bend forward to grip. The grip is set on the front telescopic rack for being located at different horizontal distances and vertical heights. The height and the distance can be adjusted according to the stature or requirement of the user so that the user can train his muscular strength efficiently and also make his body to achieve a relaxed state.

8 Claims, 9 Drawing Sheets

(51) Int. Cl.
*A63B 24/00* (2006.01)
*A61H 1/02* (2006.01)
*A63B 21/068* (2006.01)
*A63B 23/02* (2006.01)
*A63B 23/04* (2006.01)
*A63B 23/00* (2006.01)
*A63B 71/00* (2006.01)
*F16B 7/14* (2006.01)

(52) U.S. Cl.
CPC ........ *A63B 21/068* (2013.01); *A63B 21/4033* (2015.10); *A63B 21/4034* (2015.10); *A63B 21/4035* (2015.10); *A63B 21/4039* (2015.10); *A63B 21/4049* (2015.10); *A63B 23/0205* (2013.01); *A63B 23/12* (2013.01); *A63B 24/0087* (2013.01); *A61H 1/0237* (2013.01); *A61H 1/0274* (2013.01); *A61H 2201/0192* (2013.01); *A61H 2201/1207* (2013.01); *A61H 2201/164* (2013.01); *A61H 2201/1633* (2013.01); *A61H 2201/1635* (2013.01); *A61H 2201/1676* (2013.01); *A61H 2203/0406* (2013.01); *A61H 2203/0431* (2013.01); *A63B 23/0233* (2013.01); *A63B 23/04* (2013.01); *A63B 2023/003* (2013.01); *A63B 2023/006* (2013.01); *A63B 2071/0063* (2013.01); *A63B 2208/0204* (2013.01); *A63B 2208/0233* (2013.01); *A63B 2225/09* (2013.01); *A63B 2225/093* (2013.01); *F16B 7/1472* (2013.01)

(58) Field of Classification Search
CPC ..... A63B 23/04; A63B 23/12; A63B 24/0087; A63B 2023/003; A63B 2023/006; A63B 2071/0063; A63B 2208/0204; A63B 2208/0233; A63B 2225/09; A63B 2225/093; F16B 7/1472
See application file for complete search history.

(56) References Cited

U.S. PATENT DOCUMENTS

| | | | | |
|---|---|---|---|---|
| 6,485,398 | B1* | 11/2002 | Kreft | A63B 23/03575 482/147 |
| 6,918,861 | B2* | 7/2005 | Liao | A63B 22/14 482/146 |
| 7,147,589 | B2* | 12/2006 | Chae | A63B 22/14 482/51 |
| 8,128,543 | B1* | 3/2012 | Liao Lai | A63B 23/0222 297/340 |
| 2005/0054499 | A1* | 3/2005 | Davies, III | A61H 1/0229 482/131 |
| 2005/0143235 | A1* | 6/2005 | Park | A63B 21/055 482/142 |
| 2007/0254783 | A1* | 11/2007 | Yu | A63B 21/154 482/57 |
| 2008/0096723 | A1* | 4/2008 | Chang | A61H 23/0263 482/1 |
| 2008/0182736 | A1* | 7/2008 | Burrell | A47C 9/002 482/142 |
| 2009/0209397 | A1* | 8/2009 | Miskech | A63B 21/00181 482/140 |
| 2009/0258761 | A1* | 10/2009 | Quinn | A63B 21/00181 482/41 |
| 2010/0222191 | A1* | 9/2010 | Shinomiya | A63B 21/00178 482/142 |
| 2012/0065036 | A1* | 3/2012 | Abercrombie, Jr. | A61H 1/008 482/139 |
| 2012/0190513 | A1* | 7/2012 | Bonds | A63B 21/008 482/114 |
| 2014/0162852 | A1* | 6/2014 | Ho | A63B 21/023 482/127 |
| 2014/0221881 | A1* | 8/2014 | Schlauder | A63B 21/0421 601/23 |
| 2015/0202484 | A1* | 7/2015 | Lalaoua | A63B 21/025 482/127 |

* cited by examiner

ACTIVE AND PASSIVE EXERCISE TRAINING EQUIPMENT

BACKGROUND OF THE INVENTION

1. Field of the Invention

The present invention relates to an active and passive exercise training equipment and more particularly, to an active and passive exercise training equipment that a user can train his muscular strength efficiently and also make his body to achieve a relaxed state.

2. Description of the Prior Art

Modern people are lead to muscle fatigue, soreness and excessive use of the shoulder and neck because of the pressure in life, long-term poor posture or 3C product operation in the long run, therefore the need for active and passive exercise training equipment is more important for conditioning human body or the prevention of the chronic disease or pain derived from cervical spine, shoulder, back, lumbar and other parts of the body.

With the progress of technology and the popularity of fitness, rehabilitation equipment, the functional requirements of fitness and rehabilitation equipment are increasing, and especially the functional requirements of muscle joint movement in the abdomen, waist, back (such as relaxation of the back lumbar muscle group and the increase of softness), and the upper limb (such as the shoulder muscle group) continue to climb up.

In the prior art, if the four different groups of muscles are to be trained at the same time, a variety of different parts of the muscle joint movement is usually needed.

That is, the same exercise equipment cannot train the multiple muscle groups of the whole body comprehensively. Besides, the requirements of body figure (such as the height of the user's body) of the majority of exercise equipment are relatively high, and the self selectivity of the user is relatively small.

SUMMARY OF THE INVENTION

Therefore, the present invention provides an active and passive exercise training equipment for the user to train multiple muscle groups at the same time, and the size of the equipment can be adjusted according to the stature of the user to meet the requirements of the user. In an embodiment of the present invention, the active and passive exercise training equipment of the present invention comprises a swinging device, a supporting device and a front supporting device. The swinging device comprises a seat cushion with a moving function for a user to sit. The supporting device comprises a telescopic rack and a top rack for the user to grip, wherein the telescopic rack is set on the swinging device for being expanded and contracted on the swinging device, and the top rack is set on the telescopic rack for being located at different heights according to a telescopic degree of the telescopic rack. The front supporting device comprises a front telescopic rack and a front grip for the user to bend forward to grip, wherein the front telescopic rack is set on the swinging device for being expanded and contracted horizontally and vertically, and the front grip is set on the front telescopic rack for being located at different horizontal distances and vertical heights according to a telescopic degree of the front telescopic rack.

Besides, the telescopic rack of the present invention can selectively comprise a supporting tube, a support and a mounting. The supporting tube is a hollow tube and set on the swinging device, and the support is set through the supporting tube and fixed in the supporting tube via the mounting. The top rack can selectively comprise a grip for the user to grip, and the grip can be one of a hand front grip, a front grip bar and a rotating disk.

Furthermore, the front telescopic rack can selectively comprise a front supporting tube, a vertical sleeve, a vertical mounting, a horizontal sleeve and a horizontal mounting. The vertical sleeve is a hollow tube and set on the swinging device, and the front supporting tube is set through the vertical sleeve and fixed in the vertical sleeve via the vertical mounting. The horizontal sleeve is a hollow tube and set on the front supporting tube, and the front grip is set through the horizontal sleeve and fixed in the horizontal sleeve via the horizontal mounting.

The front supporting tube can selectively comprise a front grip for the user to bend forward to grip. The front grip is one of a hand front grip, a front grip bar and a rotating disk.

The swinging device can selectively comprise a base and a motor. The seat cushion is set on the base, and the motor is set between the seat cushion and the base to control the seat cushion to swing. The swinging device can selectively comprise a starter for starting the motor. The starter is set on the base and electrically connected to the motor. Besides, the swinging device can selectively comprise a buffer. The buffer is set in the seat cushion, and the buffer can be a rubber elastic part or a spring. Furthermore, the swinging device can selectively comprise a base. The base is placed flat on the ground directly, and the base comprises a back rack connected to the telescopic rack.

In the practical application, the swinging device can selectively comprise a motor, and the base can selectively comprise a seat rack and a foot fixed frame for supporting the feet of the user on the ground. The foot fixed frame can comprise a compensator, and the compensator can be adjusted to the suitable height of the user, so that the user's lower limbs (feet) can be fixed and placed on the foot fixed frame. The seat cushion is set on the seat rack, and the motor is set between the seat cushion and the seat rack to control the seat cushion to swing, and the foot fixed frame is placed flat on the ground and connected to the seat rack. The base can selectively comprise a hand rack fastened to the back rack.

In conclusion, the size of the active and passive exercise training equipment of the present invention can be adjusted according to the stature and the requirements of the user. In the practical application, the user sits on the swinging device and both feet supports on the ground, and grips the top rack with both hands, and the top rack can be adjusted to the suitable height; or bends forward to grip the front grip, and the front grip can be adjusted to the suitable horizontal distance and vertical height; at the same time, the user is affected to twist and rotate the body via the reciprocating motion of the swinging device. Wherein, the suitable height of the present invention is: both feet of the user supports on the ground, and the buttocks sit on the seat cushion and are partially away from the seat cushion to extend the body to the degree of the best exercising effect; while the suitable horizontal distance and vertical height of the present invention is: the user bends forward and both feet supports on the ground, and the buttocks sit on the seat cushion and are partially away from the seat cushion to extend the body to the degree of the best exercising effect Compare to the prior art, the active and passive exercise training equipment of the present invention is when the upper limb and the lower limb of the user are moved in opposite directions by the support of the top rack or the front grip and the torsion force of the swinging device, the upper limb and the lower limb can be extended and stretched better. The above-mentioned exercising mode processed by the active and passive exercise training equipment of the present invention can let the user exercise the upper limb and the shoulder while stretching the back and the back waist of the body to achieve muscle strength training, besides, shoulder softness is enhanced and the tension of the neck, the back and the back waist is relaxed, thereby allowing the body to relax.

The advantages and spirits of the invention may be understood by the following recitations together with the appended drawings.

BRIEF DESCRIPTION OF THE APPENDED DRAWINGS

Some of the embodiments will be described in detail, with reference to the following figures, wherein like designations denote like members, wherein.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
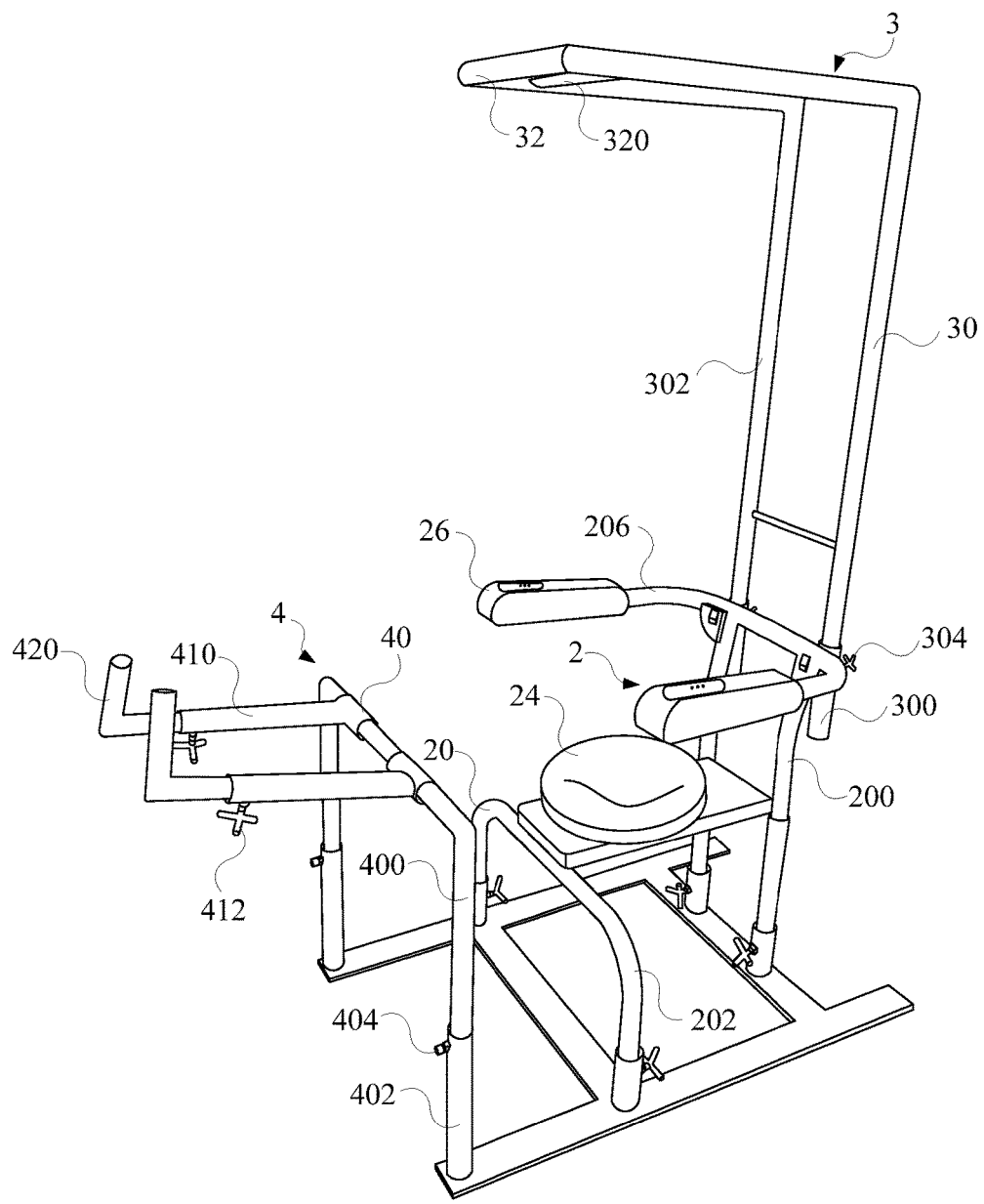
FIG. 1 shows a schematic diagram of the active and passive exercise training equipment in an embodiment of the present invention.

Please refer to FIG. 1. FIG. 1 shows a schematic diagram of the active and passive exercise training equipment in an embodiment of the present invention. In an embodiment of the present invention, the active and passive exercise training equipment 1 of the present invention comprises a swinging device 2, a supporting device 3 and a front supporting device 4. The swinging device 2 is a chair and comprises a seat cushion 24 with a moving function for a user to sit. Wherein, the moving function is selected from a group comprising a linear oscillation, a turning, a rotary movement, a swing, a two-dimensional and three-dimensional regular translation, a two-dimensional and three-dimensional irregular translation, a two-dimensional and three-dimensional regular rotation, a two-dimensional and three-dimensional irregular rotation and any combination thereof. The supporting device 3 comprises a telescopic rack 30 and a top rack 32 for the user to grip. The telescopic rack 30 is set on the swinging device 2 for being expanded and contracted on the swinging device 2, therefore the telescopic rack 30 can be adjusted according to the height of the user, and can also be adjusted according to the length of the arm and the upper limbs of the user. The top rack 32 is set on the telescopic rack 30 for being located at different heights according to a telescopic degree of the telescopic rack 30.

In an embodiment of the present invention, when the user sits on the swinging device and swings in the state that the buttocks will not completely leave the swinging device, the adjusted height of the top rack allows the user to grip the top rack with both hands lifted; but not limited to the above-mentioned height, and the user can also adjust the height according to their stature and requirements. In another embodiment of the present invention, the height of the top rack is adjusted so that the user can lift his hands slightly bend. The front supporting device 4 comprises a front telescopic rack 40 and a front grip 420 for the user to bend forward to grip. The front telescopic rack 40 is set on the swinging device 2 for being expanded and contracted horizontally and vertically, and the vertical height can be adjusted according to the height of the user, and the horizontal distance can also be adjusted according to the length of the arm and the upper limbs of the user. The front grip 420 is set on the front telescopic rack 40 for being located at different horizontal distances and vertical heights according to a telescopic degree of the front telescopic rack 40.

Besides, in an embodiment of the present invention, when the user bends forward sitting on the swinging device and swings in the state that the buttocks will not completely leave the swinging device, the adjusted position of the front grip allows the user to grip the front grip with both hands stretched forward; but not limited to the above-mentioned position, and the user can also adjust the horizontal distance and the vertical height according to their stature and requirements. In another embodiment of the present invention, the position of the front grip is adjusted so that the user can stretch his hands slightly bend.

In the practical application, the user sits on the swinging device and both feet supports on the ground, and grips the top rack with both hands; at the same time, the user is affected to twist and rotate the body via the reciprocating motion of the swinging device. In the embodiment of the present invention, when the upper limb and the lower limb of the user are moved in opposite directions by the support of the top rack and the torsion force of the swinging device, the upper limb and the lower limb can be extended and stretched better. In another embodiment of the present invention, the user sits on the swinging device and both feet supports on the ground, and grips the front grip with both hands stretched forward; at the same time, the user is affected to twist and rotate the body via the reciprocating motion of the swinging device. In the embodiment of the present invention, when the upper limb and the lower limb of the user are moved in opposite directions by the support of the front grip and the torsion force of the swinging device, the upper limb and the lower limb can be extended and stretched better. The two of the above-mentioned exercising modes can let the user exercise the upper limb and the shoulder while stretching the back and the back waist of the body to achieve muscle strength training, besides, shoulder softness is enhanced and the tension of the neck, the back and the back waist is relaxed, thereby allowing the body to relax.

In an embodiment of the present invention, the telescopic rack 30 can comprise a supporting tube 300, a support 302 and a mounting 304. The supporting tube 300 is a hollow tube and set on the swinging device 3, and the support 302 is set through the supporting tube 300 and fixed in the supporting tube 304 via the mounting 304. In the practical application, the mounting 304 can be a locking button.

Figure 2:
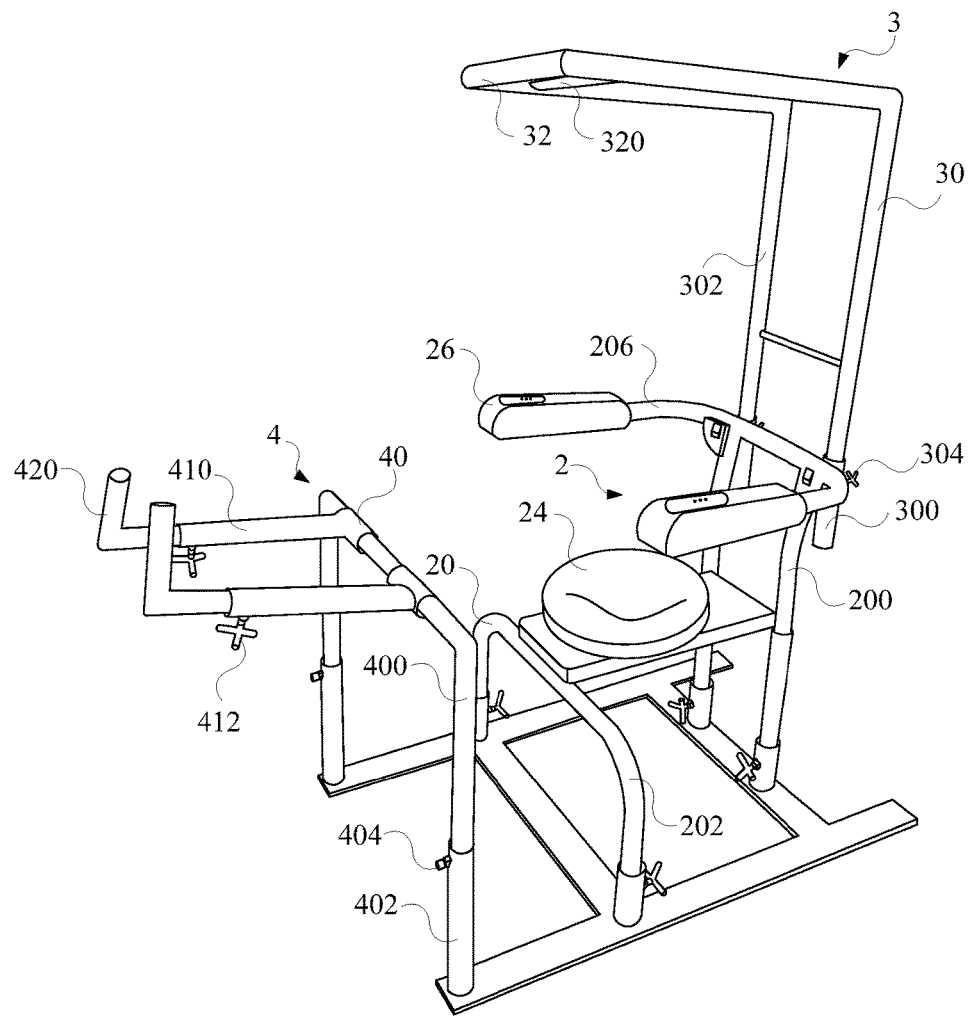
FIG. 2 shows a schematic diagram of the telescopic rack after changing relative to FIG. 1.

Please refer to FIG. 2. FIG. 2 shows a schematic diagram of the telescopic rack after changing relative to FIG. 2. In the practical application, the mounting 304 is loosened, so that the support 302 can be moved up and down in the hollow tube of the supporting tube 300, and the user can tighten the mounting 304 after adjusting the support 302 to the proper height, therefore the support 302 is locked in the supporting tube 300 and the support 302 is fixed to the particular height.

Next, as shown in FIG. 1 and FIG. 2, the top rack 32 is connected to one end of the support 302 away from the supporting tube 300. In the embodiment of the present invention, the connection between the top rack 32 and the support 302 is, but not limited to, one piece. In the practical application, the top rack 32 can be fixed on the end of the support 302 away from the supporting tube 300 by means of bolts or welding. In the practical application, the connection between the top rack 32 and the support 302 can be connected to each other pivotally, and the top rack 32 can rotate axially to the connection as the fulcrum to be adjusted to the appropriate angle or conveniently folded by the user. Therefore, the design of the whole structure of the active and passive exercise training equipment of the present invention can be used in community fitness places and gymnasiums, and can also be used in small places such as offices and homes.

In the practical application, the user can grip the top rack 32 with the palm in different angles or directions such as inside, outside, left and right, and in ways such as forehand grip, backhand grip and side hand grip.

Figure 6:
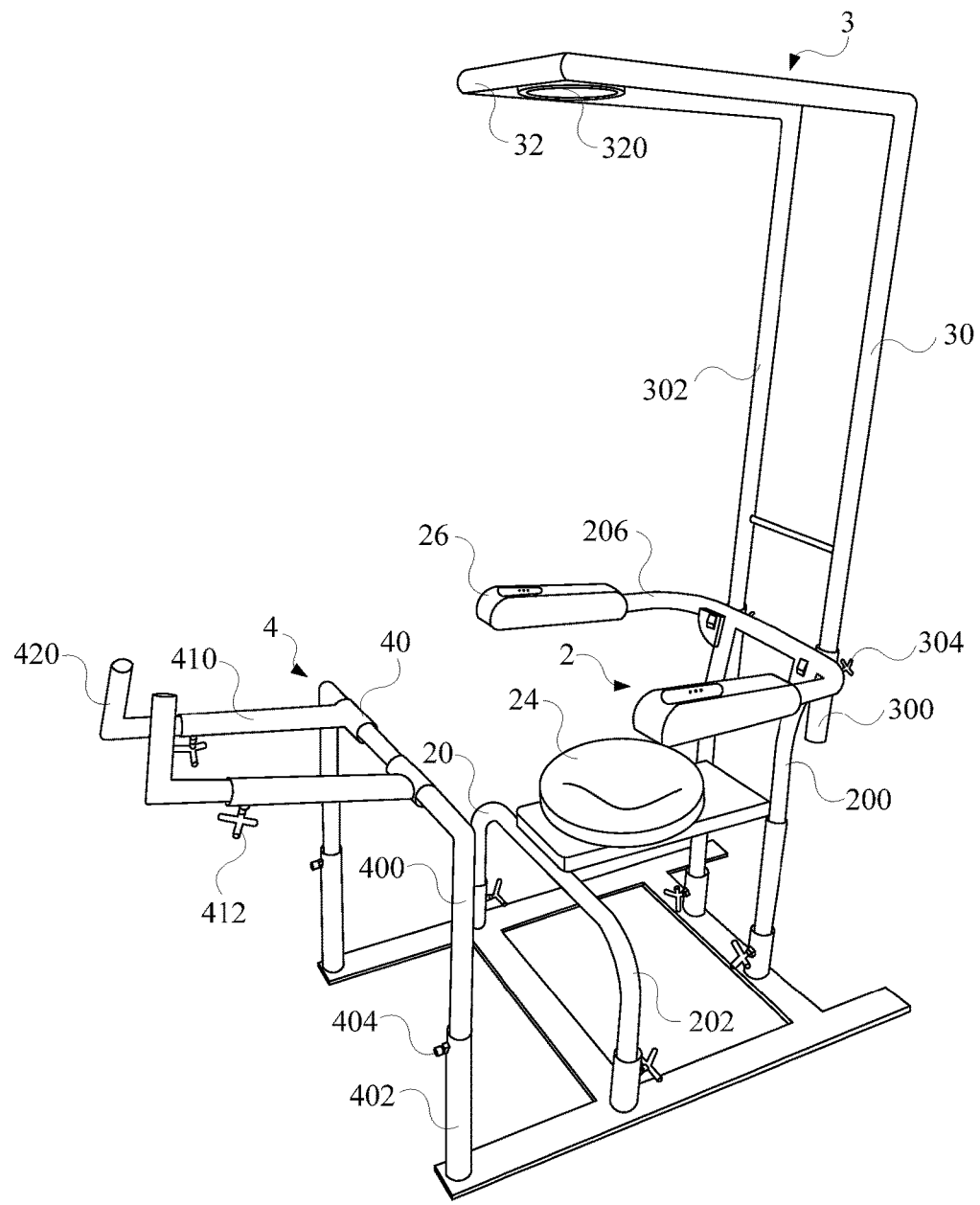
FIG. 6 shows a schematic diagram of the active and passive exercise training equipment in another embodiment of the present invention.
Figure 8:
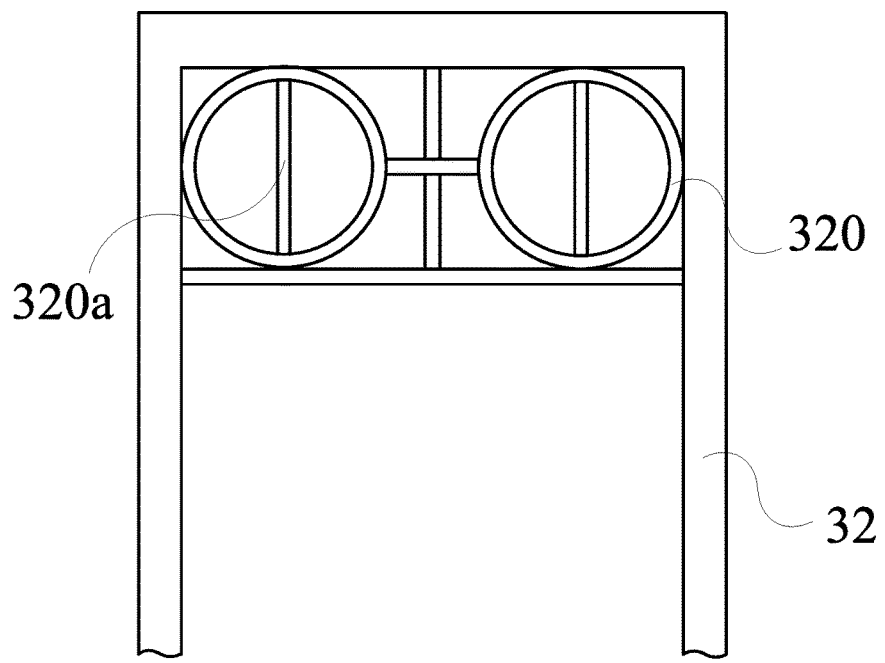
FIG. 8 shows a schematic diagram of the plane of the rotating disk of the active and passive exercise training equipment in an embodiment of the present invention.

Please refer to FIG. 1, FIG. 6 and FIG. 8 together. FIG. 6 shows a schematic diagram of the active and passive exercise training equipment in another embodiment of the present invention. FIG. 8 shows a schematic diagram of the plane of the rotating disk of the active and passive exercise training equipment in an embodiment of the present invention. In an embodiment of the present invention, the top rack 32 can further comprise a grip 320 for the user to grip. As shown in FIG. 1, the grip 320 can be, but not limited to, a front grip bar, and the grip 320 can also be the device that can be griped such as a grip disk (as shown in FIG. 6) or a rotating disk (as shown in FIG. 8). However, the actual style, shape, size and quantity of the grip are not limited to those shown in FIG. 1, FIG. 6 and FIG. 8, and can be adjusted according to the needs of the users in the practical application. Besides, in an embodiment of the present invention, the rotating disk can comprise a rotating bar 320a for the user to rotate the arm by griping the rotating bar.

In an embodiment of the present invention, the front telescopic rack 40 can comprise a front supporting tube 400, a vertical sleeve 402, a vertical mounting 404, a horizontal sleeve 410 and a horizontal mounting 412. The vertical sleeve 402 is a hollow tube and set on the swinging device 2. The front supporting tube 400 is set through the vertical sleeve 402 and fixed in the vertical sleeve 402 via the vertical mounting 404. The horizontal sleeve 410 is a hollow tube and set on the front supporting tube 400, and the front grip 420 is set through the horizontal sleeve 410 and fixed in the horizontal sleeve 410 via the horizontal mounting 412. Besides, in the practical application, the vertical mounting 404 can be a turn screw, and the horizontal mounting 412 can be a locking button.

Figure 3:
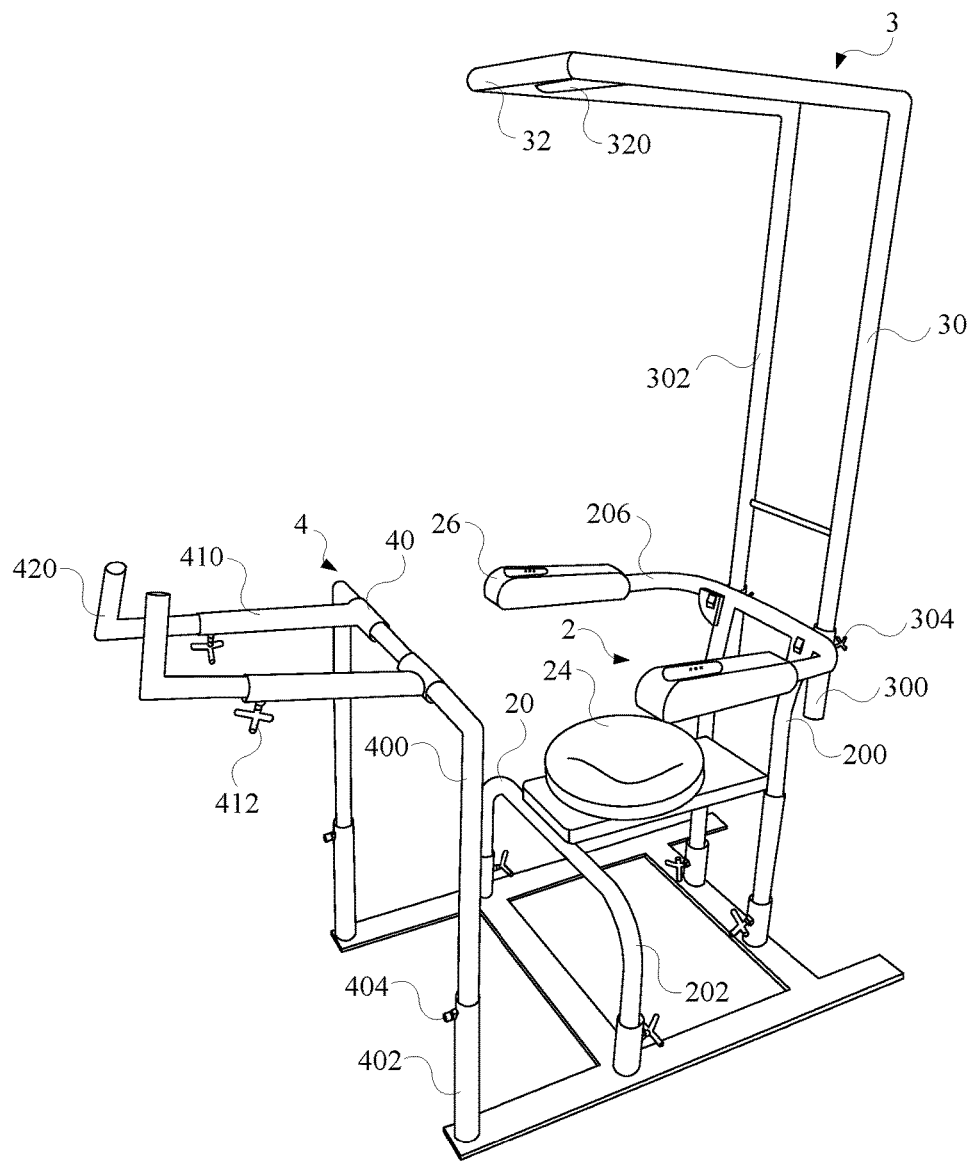
FIG. 3 shows a schematic diagram of the front telescopic rack after changing relative to FIG. 1.

Please refer to FIG. 3. FIG. 3 shows a schematic diagram of the front telescopic rack after changing relative to FIG. 1. In the practical application, the vertical mounting 404 is loosened, so that the front supporting tube 400 can be moved up and down in the hollow tube of the vertical sleeve 402, and the user can tighten the vertical mounting 404 after adjusting the front supporting tube 400 to the proper vertical height, therefore the front supporting tube 400 is locked in the vertical sleeve 402 and the front supporting tube 400 is fixed to the particular vertical height. In the practical application, the horizontal mounting 412 is loosened, so that the front grip 420 can be moved back and forth in the hollow tube of the horizontal sleeve 410, and the user can tighten the horizontal mounting 412 after adjusting the front grip 420 to the proper horizontal distance of the arm, therefore the front grip 420 is locked in the horizontal sleeve 410 and the front grip 420 is fixed to the particular horizontal distance.

Next, as shown in FIG. 1 and FIG. 3, the horizontal sleeve 410 is connected to one end of the front supporting tube 400 away from the vertical sleeve 402. In the practical application, the connection between the horizontal sleeve 410 and the front supporting tube 400 can be connected to each other pivotally, and the horizontal sleeve 410 can rotate axially to the connection as the fulcrum to be adjusted to the appropriate angle or conveniently folded by the user. Therefore, the design of the whole structure of the active and passive exercise training equipment of the present invention can be used in community fitness places and gymnasiums, and can also be used in small places such as offices and homes.

Figure 7:
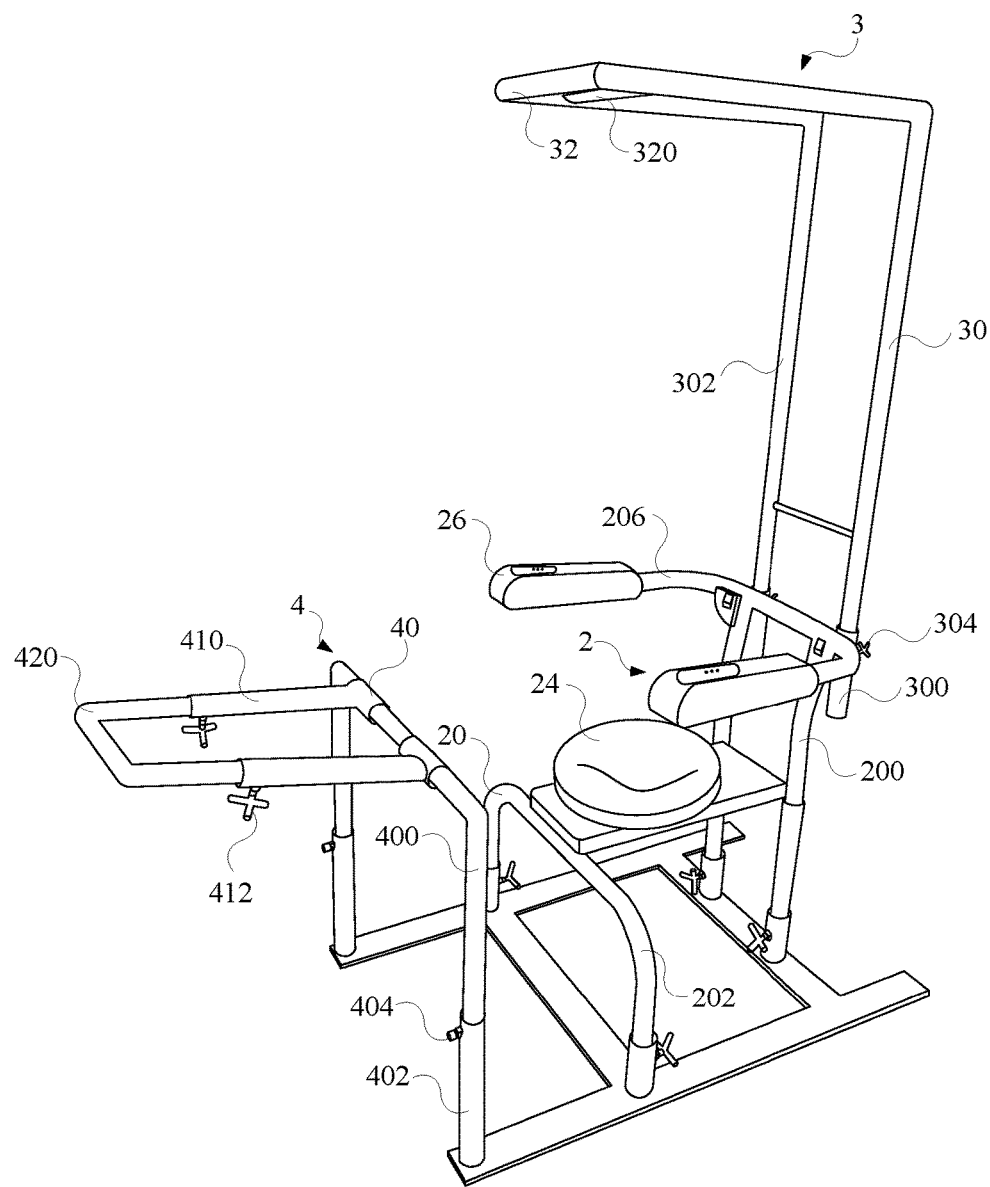
FIG. 7 shows a schematic diagram of the active and passive exercise training equipment in another embodiment of the present invention.
Figure 9:
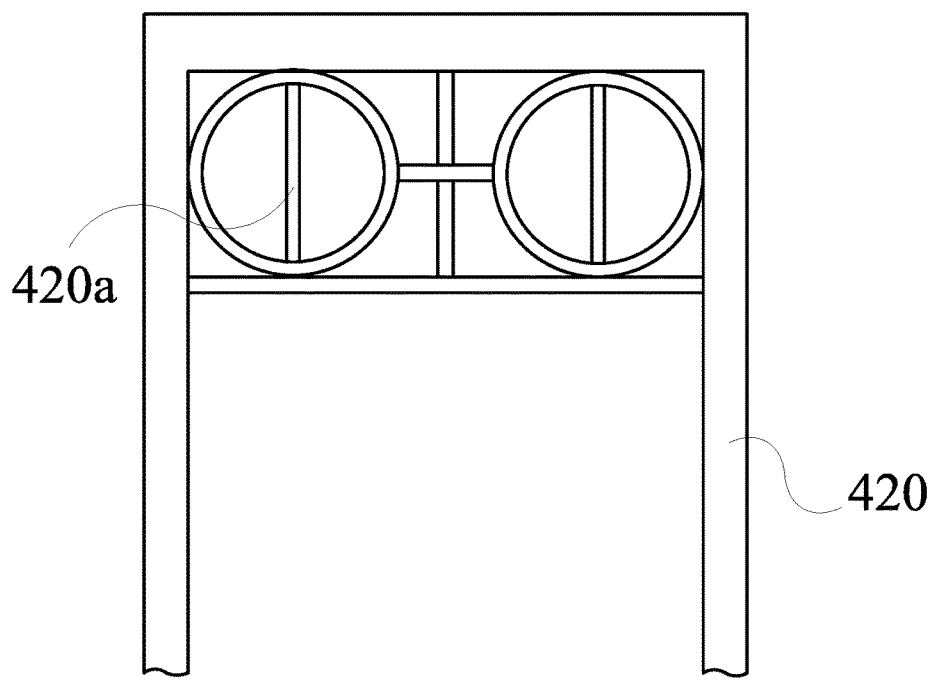
FIG. 9 shows a schematic diagram of the plane of the rotating disk of the active and passive exercise training equipment in an embodiment of the present invention.

Please refer to FIG. 1, FIG. 7 and FIG. 9 together. FIG. 7 shows a schematic diagram of the active and passive exercise training equipment in another embodiment of the present invention. FIG. 9 shows a schematic diagram of the plane of the rotating disk of the active and passive exercise training equipment in an embodiment of the present invention. In the practical application, the user can grip the front grip 420 with the palm in different angles or directions such as inside, outside, left and right, and in ways such as forehand grip, backhand grip and side hand grip.

As shown in FIG. 1, the front grip 420 can be, but not limited to, a hand front grip, and the front grip 420 can also be the device that can be griped such as a front grip bar (as shown in FIG. 7) or a rotating disk (as shown in FIG. 9). However, the actual style, shape, size and quantity of the front grip are not limited to those shown in FIG. 1, FIG. 7 and FIG. 9, and can be adjusted according to the needs of the users in the practical application. Besides, in an embodiment of the present invention, the rotating disk can comprise a rotating bar 420a for the user to rotate the arm by griping the rotating bar.

Figure 4:
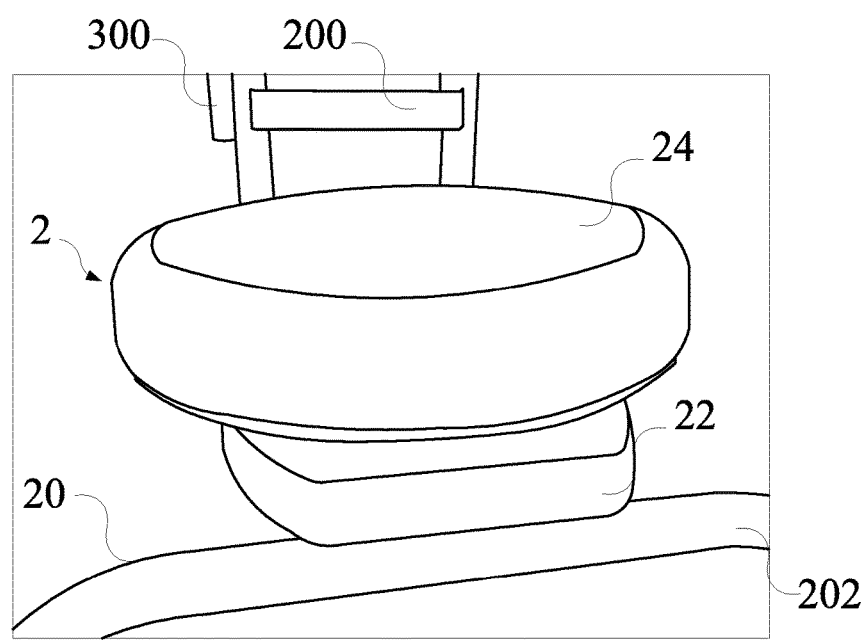
FIG. 4 shows a schematic diagram of the base, the motor and the seat cushion of the active and passive exercise training equipment in an embodiment of the present invention.

Please refer to FIG. 1 and FIG. 4. FIG. 4 shows a schematic diagram of the base, the motor and the seat cushion of the active and passive exercise training equipment in an embodiment of the present invention. FIG. 3 further illustrates some details of the part of the present invention relative to the swinging device in FIG. 1. In an embodiment of the present invention, the swinging device 2 comprises a base 20 and a motor 22 and the seat cushion 24.

The base can be placed flat on the ground directly. The seat cushion 24 is set on the base 20, and the motor 22 is set between the seat cushion 24 and the base 20 to control the seat cushion 24 to swing. When the user sits on the swinging device and both feet supports on the ground, the motor can swing the seat cushion left and right reciprocally, which can affect the hip, waist and abdomen of the user to swing.

In an embodiment of the present invention, the swinging device 2 can further comprise a starter for starting the motor 22, and the starter is set on the base and electrically connected to the motor. In an embodiment of the present invention, the starter can be, but not limited to, a button, and the starter can also be the device that can control the motor such as a toggle switch or a rotary switch. In the embodiment of the present invention, the user can operate the button to control whether the motor is activated, and thus can control whether the seat cushion swings or not.

As shown in FIG. 4, the seat cushion is round, but the shape and size of the seat cushion are not limited to those shown in FIG. 3, in the practical application, the shape and size can be adjusted according to the needs of the user, and the shape may be a square, a rectangle, an oval, a rhombus or a polygon. In an embodiment of the present invention, the swinging device can further comprise a buffer, and the buffer is set in the seat cushion for absorbing the impact of the torsion pendulum, so that the user can sit on the seat cushion more comfortably. The buffer can be a rubber elastic part, a spring or other devices capable of elastically deforming.

In an embodiment of the present invention, the base 20 can be made of, but not limited to, stainless steel, in the practical application, the base can also be made of the material with sufficient mechanical strength for people to ride such as iron, copper, aluminum alloy or plastic.

In an embodiment of the present invention, the base 20 can comprise a back rack 200. When the supporting tube 300 of the telescopic rack 30 is connected to the back rack 200, then the supporting device 3 is able to be connected to the swinging device 2. The connection between the supporting tube and the back rack can be snap-fit, screw or welding, or even can be one piece.

In an embodiment of the present invention, the base 20 can comprise a back rack 200 and a hand rack 206 fastened to the back rack 200. The hand rack can further comprise an anti-skid grip with cushioning and anti-skid effect. When the user wants to end the exercise, the user can retract the hands griped on the top rack and place on the hand rack as a cushioning movement to end the exercise.

Figure 5:
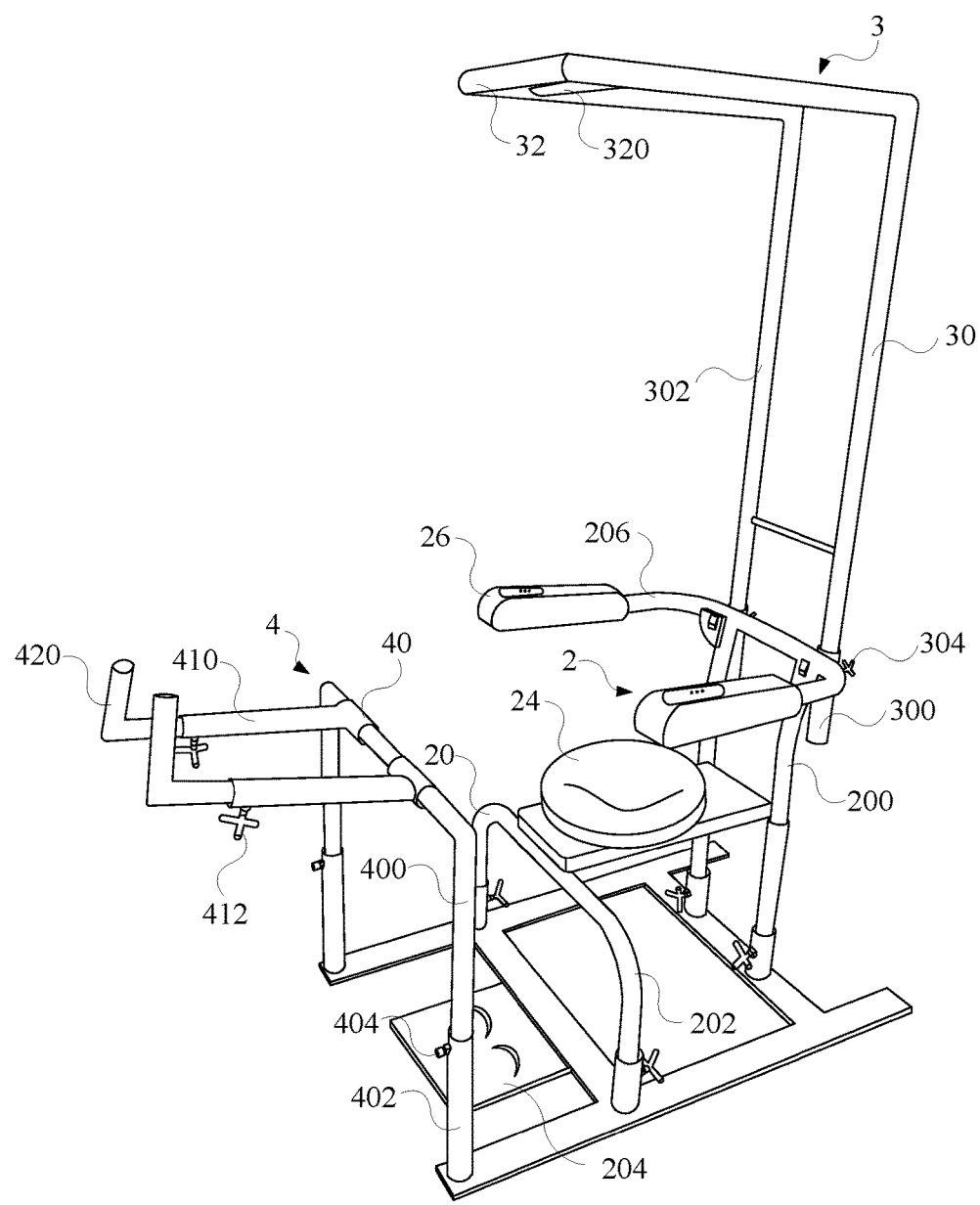
FIG. 5 shows a schematic diagram of the active and passive exercise training equipment in another embodiment of the present invention.

Please refer to FIG. 5. FIG. 5 shows a schematic diagram of the active and passive exercise training equipment in another embodiment of the present invention. In an embodiment of the present invention, the base 20 can comprise a back rack 200, a seat rack 202 and a foot fixed frame 204 for supporting the feet of the user on the ground. The foot fixed frame 204 can comprise a lace for fixing the feet of the user on the foot fixed frame. The foot fixed frame 204 can comprise a compensator, and the compensator can be adjusted to the suitable height of the user, so that the user's lower limbs (feet) can be fixed and placed on the foot fixed frame. The back rack 200 is vertically connected to the seat rack 202, and horizontally connected to the telescopic rack 30. The seat cushion 24 is set on the seat rack 202, and the motor 22 is set between the seat cushion 24 and the seat rack 202 to control the seat cushion 24 to swing. The foot fixed frame is placed flat on the ground and connected to the seat rack for limiting the feet of the user on the ground and able to maintain a better posture. When the user sits on the swinging device, the user's lower limbs (feet) can be fixed on the ground via the fixation of the foot fixed frame.

Besides, the swinging device 2 can further comprise a starter for starting the motor 22, and the starter is set on the base and electrically connected to the motor. In an embodiment of the present invention, the base 20 can further comprise a hand rack 206. The hand rack 206 is fastened to the back rack 200. The starter can be set on the hand rack 206 and electrically connected to the motor, so that the user can control whether the motor is activated via the operation of the starter, and thus can control whether the seat cushion swings or not.

The user sits on the seat cushion and both feet supports on the ground or the foot fixed frame, and grips the grip of the top rack or bends forward to grip the front grip with both hands; at the same time, the motor swings the seat cushion left and right reciprocally to affect the user to swing around and rotate the body. In the embodiment of the present invention, when the upper limb and the lower limb of the user are moved in opposite directions by the top rack or the front grip and the torsion force of the swinging device, the upper limb and the lower limb can be extended and stretched better.

In conclusion, in the process of using the active and passive exercise training equipment, the user can achieve the exercise and training of the muscles of the neck, shoulder, arm, chest, waist, back and leg, and thus can achieve the activities of the body bones, muscle relaxation and increase the flexibility of the body joints.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An active and passive exercise training equipment, comprising:
a swinging device, comprising a seat cushion for a user to sit, wherein the seat cushion has swing functions, and the swinging device further comprises a hand rack for the user to place his hands; and
a front supporting device, comprising a front telescopic rack and a front grip for the user to bend forward to grip, wherein the front telescopic rack is set on the swinging device for being expanded and contracted horizontally and vertically, and the front grip is set on the front telescopic rack for being located at different horizontal distances and vertical heights according to a telescopic degree of the front telescopic rack;
wherein the front telescopic rack comprises a front supporting tube and a vertical mounting, and the swinging device further comprises a vertical sleeve, and the front supporting tube is set through the vertical sleeve, and the vertical mounting is used to adjust and fix the vertical height of the front supporting tube; wherein the front telescopic rack further comprises a horizontal sleeve and a horizontal mounting, and the horizontal sleeve is set on the front supporting tube, and the front grip is set through the horizontal sleeve, and the horizontal mounting is used to adjust and fix the horizontal distance of the front grip.

2. The active and passive exercise training equipment of claim 1, wherein the front grip is one of a hand front grip, a front grip bar and a rotating disk, and the top rack comprises a grip for the user to grip, and the grip is one of a grip bar, a grip disk and a rotating disk.

3. The active and passive exercise training equipment of claim 1, wherein the swinging device further comprises a base and a motor, and the seat cushion is set on the base, and the motor is set between the seat cushion and the base to control the seat cushion to swing.

4. The active and passive exercise training equipment of claim 3, wherein the swinging device further comprises a starter for starting the motor, and the starter is set on the base and electrically connected to the motor.

5. The active and passive exercise training equipment of claim 3, wherein the swinging device further comprises a buffer, and the buffer is set in the seat cushion, and the buffer can be a rubber elastic part or a spring.

6. The active and passive exercise training equipment of claim 1, wherein the swinging device comprises a base, and the base is placed flat on the ground directly, and the vertical sleeve is connected to the base.

7. The active and passive exercise training equipment of claim 6, wherein the swinging device further comprises a motor, and the base further comprises a seat rack and a foot fixed frame for supporting the feet of the user on the ground, and the seat cushion is set on the seat rack, and the motor is set between the seat cushion and the seat rack to control the seat cushion to swing, and the foot fixed frame is placed flat on the ground and connected to the seat rack.

8. The active and passive exercise training equipment of claim 1, further comprising a supporting device, wherein the supporting device comprises a telescopic rack and a top rack for the user to grip, the telescopic rack is set on the swinging device for being expanded and contracted on the swinging device, and the top rack is set on the telescopic rack for being located at different heights according to a telescopic degree of the telescopic rack; wherein the telescopic rack comprises a supporting tube, a support and a mounting, and the supporting tube is a hollow tube and set on the swinging device, and the support is set through the supporting tube and fixed in the supporting tube via the mounting.

* * * * *